(No Model.)
S. C. LEVY.
CLOCK ATTACHMENT FOR BICYCLES.
No. 495,254. Patented Apr. 11, 1893.
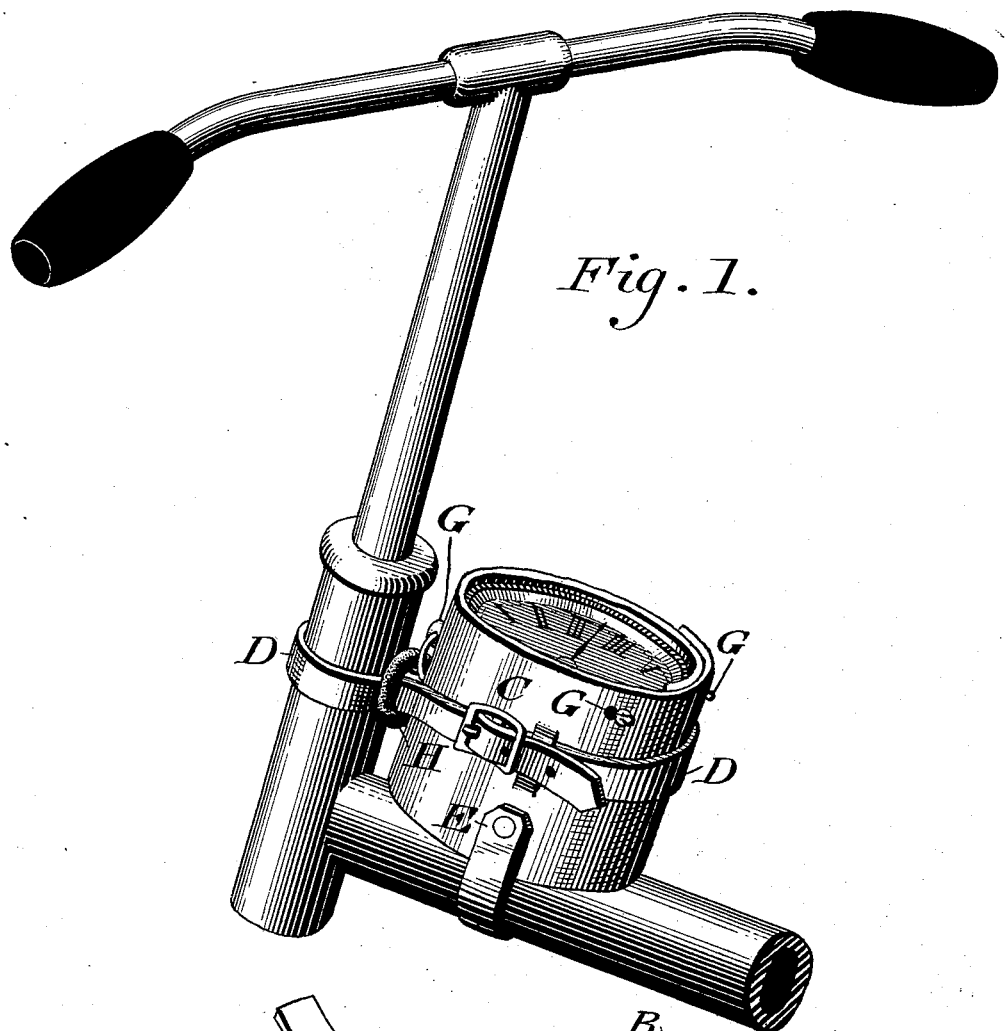

UNITED STATES PATENT OFFICE.

SIMON C. LEVY, OF PHILADELPHIA, PENNSYLVANIA.

CLOCK ATTACHMENT FOR BICYCLES.

SPECIFICATION forming part of Letters Patent No. 495,254, dated April 11, 1893.

Application filed June 9, 1892. Serial No. 436,045. (No model.)

*To all whom it may concern:*

Be it known that I, SIMON C. LEVY, a citizen of the United States, residing in the city and county of Philadelphia, State of Pennsylvania, have invented a new and useful Improvement in Clock-Carriers for Bicycles, &c., which improvement is fully set forth in the following specification and accompanying drawings.

My invention consists of a carrier for a clock or timepiece, the same being constructed of a casing and means for connecting the latter with proper portions of a bicycle or other vehicle, as will be hereinafter set forth.

Figure 1 represents a perspective view of a clock carrier embodying my invention, showing also a portion of a bicycle with which the carrier is connected. Fig. 2 represents a perspective view of the carrier in flat condition.

Similar letters of reference indicate corresponding parts in the two figures.

Referring to the drawings:—A designates a piece of leather or other suitable flexible material to which are attached the buckles B, C, and the straps D, E, it being noticed that said straps and buckles are respectively at right angles to each other. In the piece A are openings F for the passage therethrough of the projecting parts of a clock, such as shown at G thereon.

The operation is as follows: The piece A is wrapped around the clock or otherwise converted into a casing to receive the clock, and the projections of the latter passed through the openings of the piece. The strap D is passed around the casing, and a standard of the bicycle, &c., and connected with the buckle C. The strap E is passed around a proper rail, reach, &c., of the bicycle, and connected with the buckle B and thus the casing with its inclosed clock is nicely sustained in position, the flexible nature of the casing and of the connections preventing severe shocks to the clock when the bicycle is in use. In order to render the connection of the straps with the parts of the bicycle still more flexible, and likewise elastic, I employ rubber rings such as H, one of which is shown on the strap D, the same drawing the two lengths of said strap toward each other between the standard and the casing, and adding elasticity to said strap, the effect of which is evident.

Having thus described my invention, what I claim as new, and desire to secure by Letters Patent, is—

1. A clock support for a bicycle, consisting of the piece A of a flexible material, having the strap E and buckle B secured to one side, and the strap D projecting from said piece A at right angles to the strap E and having the buckle C at its inner end, said parts being combined substantially as described.

2. A clock support for a bicycle, &c., consisting of a piece of flexible material adapted to inclose said clock having openings for the projecting parts of the latter, and means for connecting said piece with a proper part of the bicycle, &c., said clock being freely suspended from the wall of said inclosing piece substantially as described.

3. A casing for a clock, formed of flexible material with means for suspending the clock from the wall thereof and straps attached thereto for connection with proper parts of a bicycle, &c., and an elastic ring embracing the strap between said casing and the adjacent part of the bicycle, &c., substantially as described.

SIMON C. LEVY.

Witnesses:
A. P. JENNINGS,
JOHN A. WIEDERSHEIM.